United States Patent [19]

Aschwanden

[11] 4,264,918
[45] Apr. 28, 1981

[54] AUTOMATIC CHROMA GAIN CONTROL CIRCUITS USEFUL IN SECAM CODERS

[75] Inventor: Felix Aschwanden, Thalwil, Switzerland

[73] Assignee: RCA Corporation, New York, N.Y.

[21] Appl. No.: 94,279

[22] Filed: Nov. 19, 1979

[30] Foreign Application Priority Data

Apr. 5, 1979 [GB] United Kingdom ............... 12024/79

[51] Int. Cl.³ .................... H04N 9/62; H04N 9/40
[52] U.S. Cl. ........................................ 358/10; 358/14; 358/27
[58] Field of Search ................... 358/10, 14, 40, 27; 455/110, 113

[56] References Cited

PUBLICATIONS

Tekh. Kino & Telev. (USSR), No. 1, pp. 52–55, Jan. 1971.

*Primary Examiner*—Robert L. Richardson
*Attorney, Agent, or Firm*—Paul J. Rasmussen; William H. Meise; Henry I. Steckler

[57] ABSTRACT

A method and circuit for controlling the gain of a SECAM camera inserts a test signal into a channel. The resulting deviation is measured and used to control the gain of the channel.

10 Claims, 12 Drawing Figures

AUTOMATIC CHROMA GAIN CONTROL CIRCUITS USEFUL IN SECAM CODERS

BACKGROUND OF THE INVENTION

The present invention relates to automatic gain control circuits, and more particularly to those used in the chroma channel of a SECAM encoder.

Recent developments concerning the French SECAM standard indicate that several tolerances of the SECAM system will be made much tighter in the future. This not only leads to problems in designing encoder circuits, but also makes it difficult to adjust SECAM encoders in the production line. Test equipment such as vectorscopes, which enable simple and precision adjustment of NTSC or PAL encoders, do not exist for SECAM. Therefore it is very desirable to introduce self-adjusting circuits in SECAM encoders.

SUMMARY OF THE INVENTION

It is therefore an object of the invention to provide an automatic chroma channel gain adjusting circuit and method.

In brief, this and other objects are achieved by inserting a test signal into the channel, then measuring the resulting deviation due to the test signal and then controlling the gain of the channel.

DESCRIPTION OF THE INVENTION

The SECAM system uses a frequency modulation of the subcarrier by the line sequential color difference signals. The center frequency of the color subcarrier is $F_{OB}=4.25$ MHz for the B-Y signal and $F_{OR}=4.40625$ MHz for the R-Y signal. The maximum deviation of the subcarrier is represented by $D_B$ and $D_R$ for the B-Y and R-Y signals respectively and should be kept to an accuracy of 10 kHz. During the occurrence of horizontal synchronization pulses, the modulator is resynchronized to $F_{OB}$ or $F_{OR}$.

Figure 1:
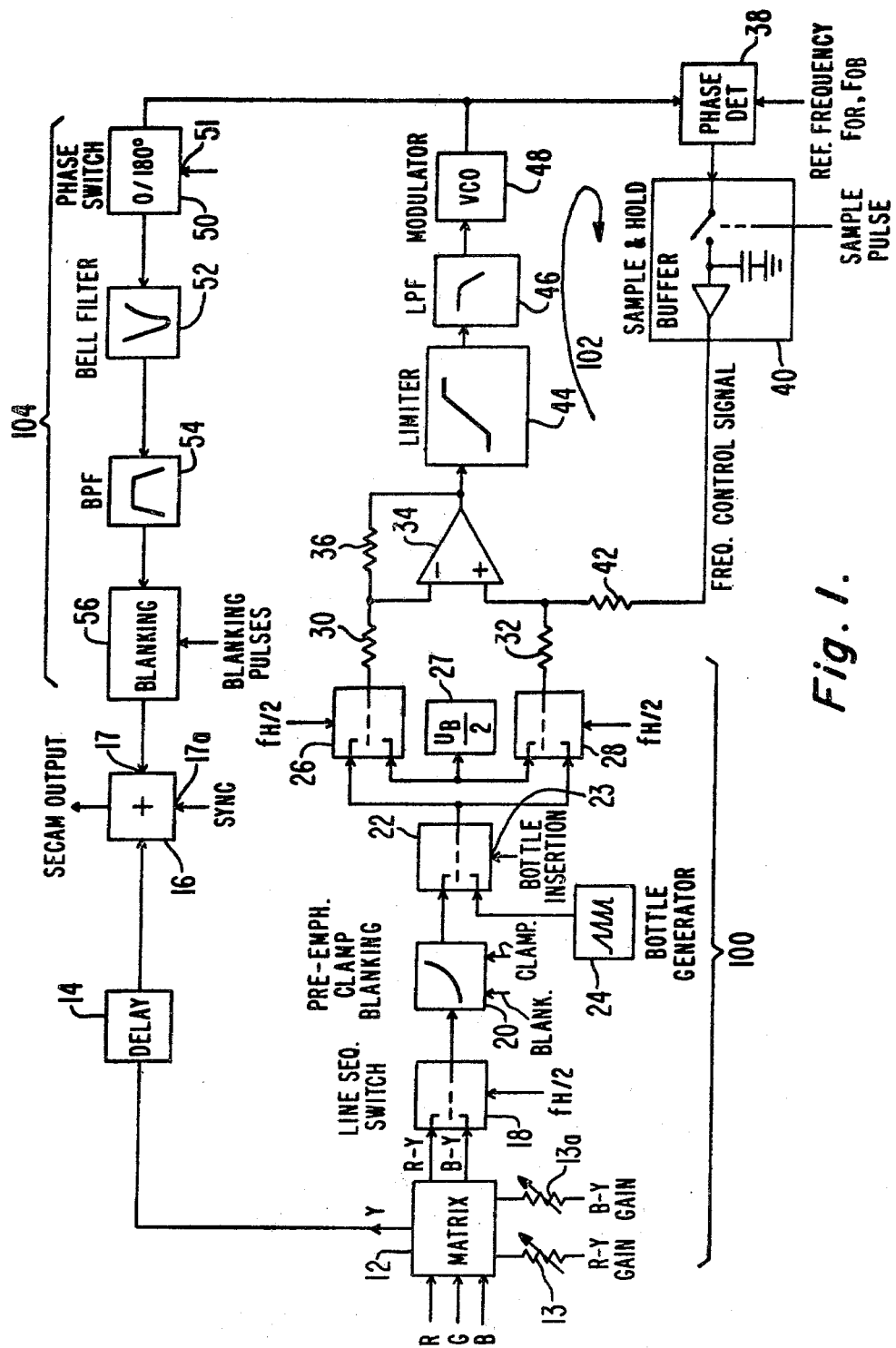
FIG. 1 shows a block diagram of a SECAM encoder.

FIG. 1 shows a circuit of a SECAM encoder. The first portion 100 is a baseband signal processing portion that takes three primary color signals and forms properly pre-emphasized and clamped line sequential signals having line identification signals. These signals are applied to a frequency control loop 102 that provides a baseband SECAM FM color signal from VCO 48 in accordance with the line sequential signals. The FM signal is then applied to a high frequency signal processing portion 104 that does alternate-line phase inversion, more pre-emphasis, and filtering.

Now examining FIG. 1 in more detail, the R, G, and B signals from an appropriate source, such as camera pickup tubes, are applied to a matrix 12. Matrix 12 comprises potentiometers 13 and 13a for manually adjusting the amplitudes of the color difference signal R-Y and B-Y. These potentiometers will be replaced by the present invention for automatic adjustment. One output provides the luminance signal Y, which is applied to a delay circuit 14, which compensates for the inherent circuitry delay that chrominance signals applied to input 17 or adder 16 undergo. From there the luminance signal is applied to adder 16, which also receives composite synchronization signals at input 17a. Color difference signals (R-Y, B-Y) are also produced by matrix 12, are alternately fed through line sequential switch 18, which receives a half line frequency switching control signal, ($f_H/2$), to a pre-emphasis, clamping and blanking circuit 20, which receives blanking and clamping pulses. In circuit 20, the color difference signals are given a low frequency pre-emphasis, in accordance with SECAM standards. Then they are clamped to a voltage $U_B/2$ during the blanking interval. From circuit 20 the color difference signals go to a switch 22. During the vertical identification period, which is a time period during the field blanking time when signals are sent that indicate which color difference signal is being transmitted, switch 22, which is controlled by a bottle insertion signal applied to control input 23, connects the sawtooth output signal of the bottle generator 24 (which is formally called a SECAM line identification signal generator) to the one input of each of the switches 26 and 28. At other times one of the color difference signals is applied to switches 26 and 28. Switches 26 and 28 are controlled by means of an $f_H/2$ signal, similar to the operation of switch 18. During the occurrence of the B-Y line, resistor 30 is connected to a voltage source 27 of value $U_B/2$ through switch 26, while resistor 32 is connected to the output of switch 22 through switch 28 so as to feed the B-Y signal to the non-inverting input of the amplifier 34. During the occurrence of the R-Y line, the output of switch 22 is connected to resistor 30 and to the inverting input of amplifier 34 through switch 26. At the same time, voltage source 27 is connected by switch 28 to resistor 32 to the non-inverting input. This alternation of the color signals applied to amplifier 34 alternates the direction of deviation of the R-Y and B-Y color signals. Resistor 36 supplies negative feedback to control the gain of amplifier 34. Also a center frequency control signal generated by means of a phase detector 38, that receives during alternate lines the frequencies $F_{OR}$ and $F_{OB}$, and a sample-and-hold circuit 40, is added at the non-inverting input of amplifier 34 through resistor 42. The sample pulse for sample-and-hold circuit 40 comprises a horizontal synchronization pulse. This resynchronizes VCO 48 to the frequencies $F_{OR}$ or $F_{OB}$ during the horizontal synchronization period. After passing through an amplitude limiter stage 44, that controls the deviation limits, and a low pass filter 46, which has a cutoff frequency of about 1.3 MHz, the output signal of amplifier 34 modulates the frequency of the voltage controlled oscillator 48 when it is not being resynchronized. The output of the voltage controlled oscillator 48 is applied to subcarrier phase switch 50, which receives a switching signal at input 51 to cause a 180 degree phase inversion each frame and also on one line out of every three in accordance with SECAM standards. The output of switch 50 is fed through a bell shaped response filter 52 to increase the color subcarrier amplitude during high subcarrier frequency deviation, which also is in accordance with SECAM standards. A band pass filter 54, which has a band pass of from 3 to 5.5 MHz, receives the output of filter 52 and applies it to a blanking circuit 56, which receives blanking pulses, before the FM color signal is added to the Y and composite sync signals by adder 16.

Figure 2:
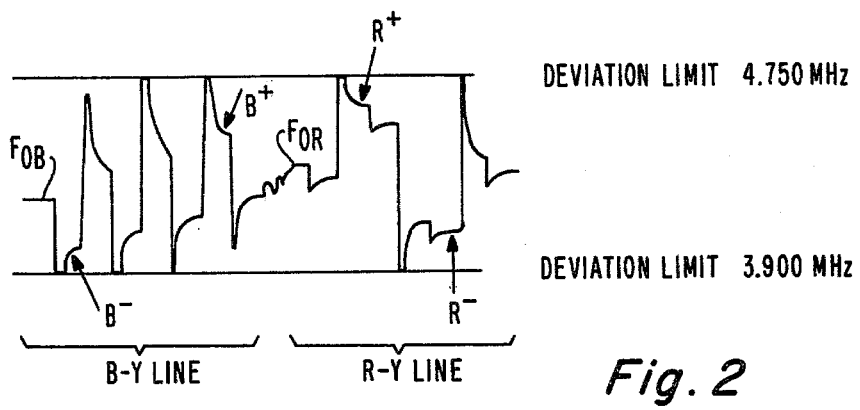
FIGS. 2 and 3 show time diagrams.

For both color difference signals the subcarrier is modulated so that there is a linear relationship between the change in subcarrier frequency and the value of the color difference signals. The deviations for European Broadcast Union color bars are as follows and are shown in FIG. 2 together with the maximum deviation limits of 4.756 MHz and 3.900 MHz:

| | | |
|---|---|---|
| R+ = + 280 kHz  4406.25 + 280 kHz = 4686.25 kHz | | |
| R− = − 280 kHz  4406.25 − 280 kHz = 4126.25 kHz | TOLERANCES: | |
| B+ = + 230 kHz  4250 + 230 kHz = 4480 kHz | < ± 5 kHz | |
| B− = − 230 kHz  4250 − 230 kHz = 4020 kHz | | |

Figure 3:
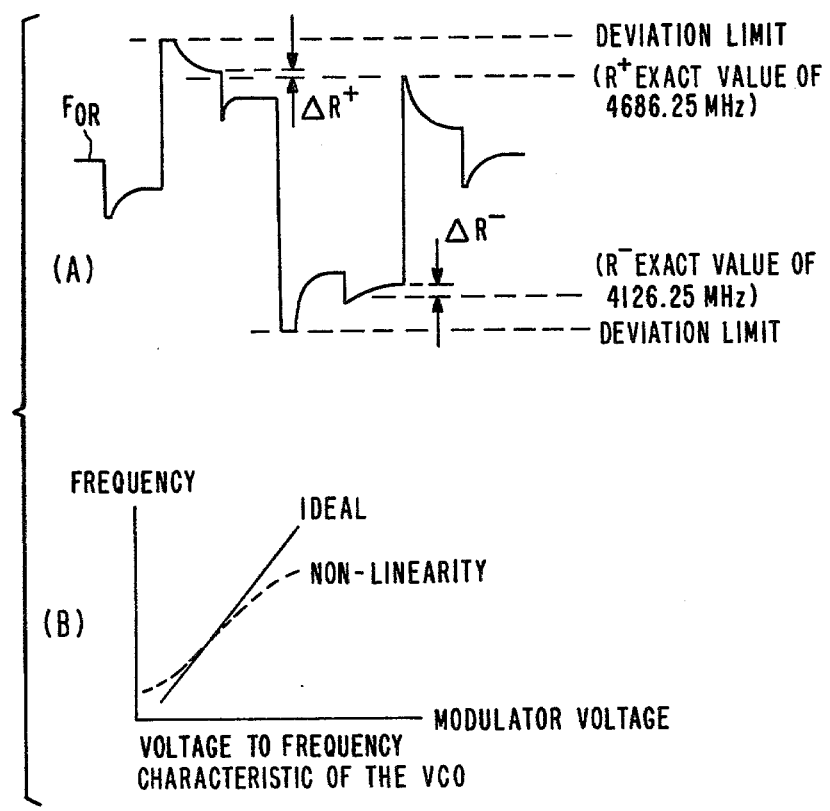

Current SECAM coders need two adjustments for R-Y and B-Y gain (potentiometers 13 and 13a in FIG. 1). It is not easy to set the chroma gain in the production line for two reasons:

(a) the tolerances are $< \pm 5$ kHz and
(b) due to nonlinearity of the modulator (VCO 48) a compromise must be made, as can be seen in the example of FIG. 3a, which shows an ideal R-Y line modulator transfer function and the actual non-linear modulator transfer function.

Best compromise is obtained if $$\Delta R^- = -\Delta R^+ \text{ or } -\Delta R^- = \Delta R^+$$

The same is true for the B-Y line. It has been found in practice that the nonlinearity of the voltage controlled oscillators normally used is $< \pm 1\%$ which is shown in exaggerated form in FIG. 3b. Assuming an error of ±1% for worst case consideration, this results in a deviation error of ±2.8 kHz (for ±280 kHz deviation). Therefore, it makes no sense to adjust, for example, the chroma gain very accurately for the R+ deviation because the R− signal then may be out of the tolerance. It should be noted that the slope of the voltage to frequency characteristic of the oscillator also changes due to temperature changes or ageing. An automatic chroma gain circuit has not only to compensate for the gain change of the VCO, but it must also set the gain automatically to the best compromise of the R+ and R− deviation and B+ and B− deviation, respectively.

Figure 4:
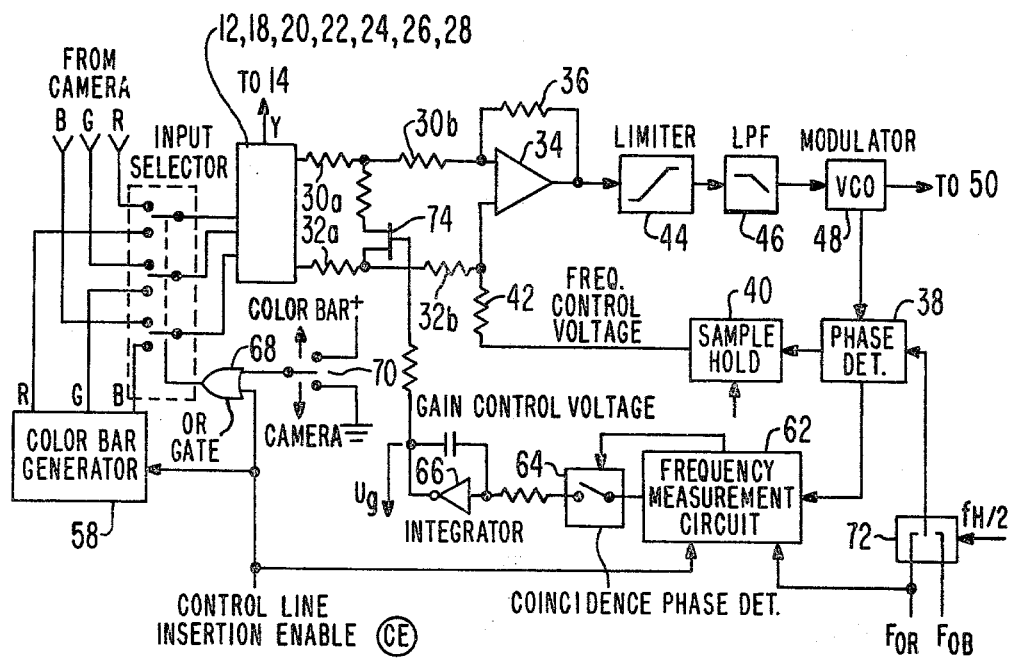
FIG. 4 shows a block diagram of one embodiment of the invention.
Figure 5:
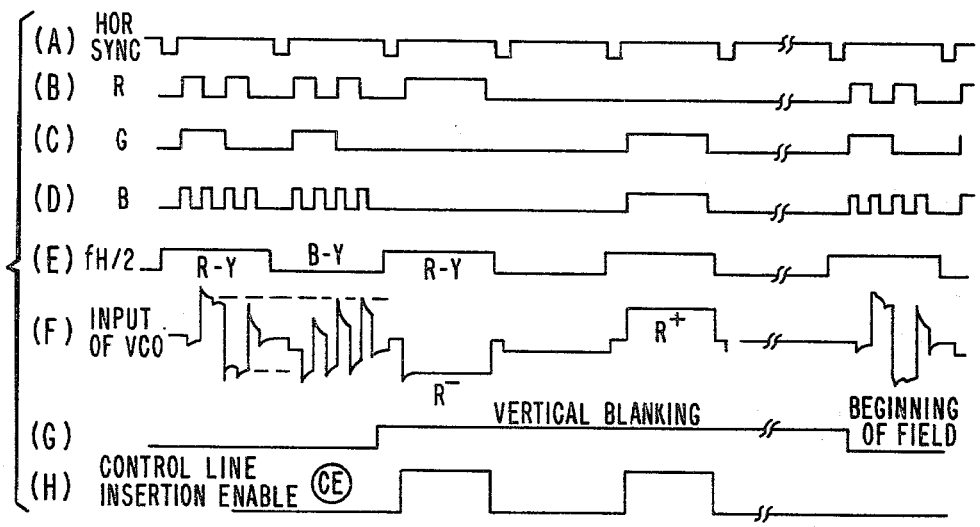
FIG. 5 shows some time diagrams.

FIG. 4 shows a block diagram of a circuit in accordance with the invention wherein corresponding elements have been given reference numbers corresponding to that of FIG. 1. It will be noted that the box labelled 12, 18, 20, 22, 26, 28 comprises those similarly numbered elements as shown in FIG. 1. Further, for simplicity, those portions of FIG. 1 that are unchanged are not shown. The circuit of FIG. 4 allows control of the gain of the R-Y line. A control circuit for the B-Y line is identical and is not shown. Just after the beginning of the vertical blanking interval, an R+ only and an R− only signal as shown in FIG. 5f from color bar generator 58, which generates the standard known EBU color bars, are inserted into matrix 12 by input selector switch 60. A frequency measurement circuit 62, which is shown in greater detail in FIG. 7, measures the frequency of the deviated subcarrier from detector 38 for both signals, R+ and R−, respectively. Phase detector 38 has alternate reference signals $F_{OR}$ and $F_{OB}$ alternately applied to it by switch 72 under the control of half line frequency pulses as shown in FIG. 5e. By means of a coincidence phase detector 64 and an integrator circuit 66, a D.C. voltage is generated in order to control the R-Y chroma gain so that $R+ + R-/2 = 280$ kHz. To ensure that the gain loop also operates correctly if the input of matrix 12 is connected to an external source (e.g., the pick-up tubes of a camera), the input selector switch 60 is periodically switched to the color bar generator output during R+ only and R− only by means of an OR gate 68. The generator 58, gate 68, and measuring circuit 62 are under the control of a control line insertion enable signal labelled "CE" (shown in FIG. 5h) to ensure that insertion takes place at the beginning of the vertical blanking interval (shown in FIG. 5g). Further a switch 70 provides a manually selectable control of insertion of a signal from a camera or color bar generator 58. The R+ only and R− only signals comprises the RGB combinations as follows:

| R+ (= red) | R− (= cyan) |
|---|---|
| R = High | R = L |
| G = Low | G = H |
| B = Low | B = H |

Note that the color bar generator 58 and the input selector 60 are already present in the RCA Model TK-47 camera.

Figure 6:
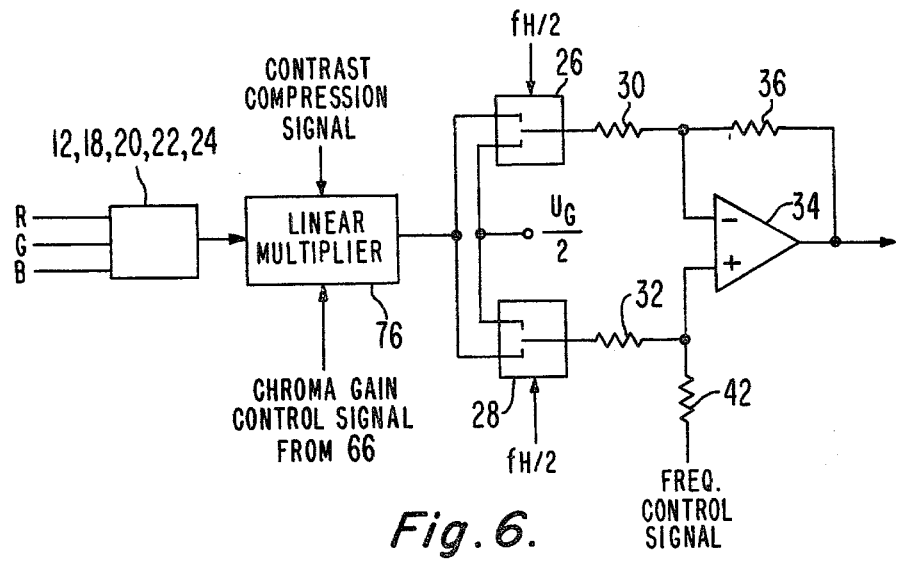
FIG. 6 shows an alternate embodiment.

The gain control element in FIG. 4 comprises a FET 74 which is connected as a variable shunt resistor. The resistors 30 and 32 of FIG. 1 are divided into two parts 30a/30b and 32a/32b, respectively, and form in connection with the FET, a variable attenuator, which responds to the gain control voltage from integrator 66 applied to FET 74 gate. This circuit works well for relatively low signal amplitudes (<300 mV peak to peak). For higher signal amplitudes the attenuation becomes signal-dependent. A more sophisticated solution uses a linear multiplier circuit 76 as shown in FIG. 6 instead of gate 74. In the RCA Model TK-47 camera this multiplier circuit is already built in and used as the "contrast compression" multiplier. It is very simple to feed the chroma gain control signal to the same linear multiplier 76 so that no FET attenuator 74 is necessary. But for the operation of the automatic chroma gain control circuit of the invention either type of gain control element can be used.

Figure 7:
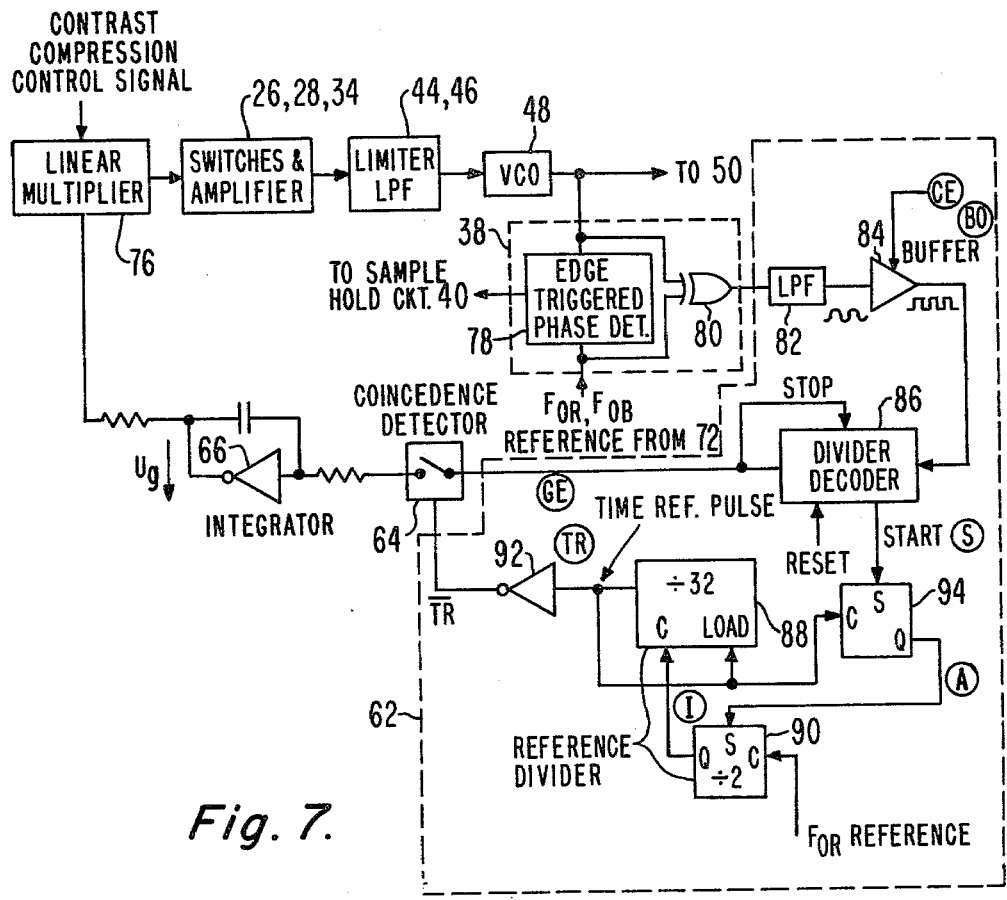
FIG. 7 shows a more detailed block diagram of the alternate embodiment.

The block diagram in FIG. 7 shows more details of the circuit of the invention, where corresponding elements have been given corresponding reference numbers and some elements already described have been shown in consolidated blocks. The output of the VCO 48 is fed to the phase detector 38 which can be MC 4044 from Motorola which contains an edge triggered phase detector 78 used to synchronize the VCO 48, and an EX-OR (Exclusive OR) gate 80, which operates as a frequency mixer for the VCO signal and the reference frequency. This difference frequency is 280 kHz for R+ and R−, respectively, if the R-Y gain is correctly adjusted, and if the VCO 48 is absolutely linear. Note that the reference frequency at the input of the phase detector is $F_{OR}$ (=4.40625 MHz) for the R-Y line and $F_{OB}$ (=4.25 MHz) for the B-Y line.

The output of the EX-OR gate 86 is lowpass filtered by filter 82 and fed to a buffer 84 whose gain is so high that it saturates and produces a square wave output signal when control enable signal CE applied to it is high. From buffer 84, the pulses are applied to divider-decoder 86, where it is divided by 4 to form a signal to be measured by detector 64. One output of the divider decoder 86 is used to start a reference divider comprising dividers 88 and 90 which generates a time reference pulse (TR), which is fed to coincidence detector 64 through inverter 92. If the divide-by-4 output of the divider-decoder 86 is in coincidence with the time reference pulse TR, the output voltage $U_g$ of the integrator 66 does not change and the R-Y gain is exact. Otherwise $U_g$ changes until coincidence is achieved. The enable signal CE applied to the buffer stage 84 ensures that only during the two control lines (R− only, R+ only, see FIGS. 5f and h) is the output of the EX-OR gate 80 fed to the divider-decoder 86. This enable signal CE is the same as in FIG. 4 and FIG. 5h, where it is called "control line insertion enable."

Figure 8:
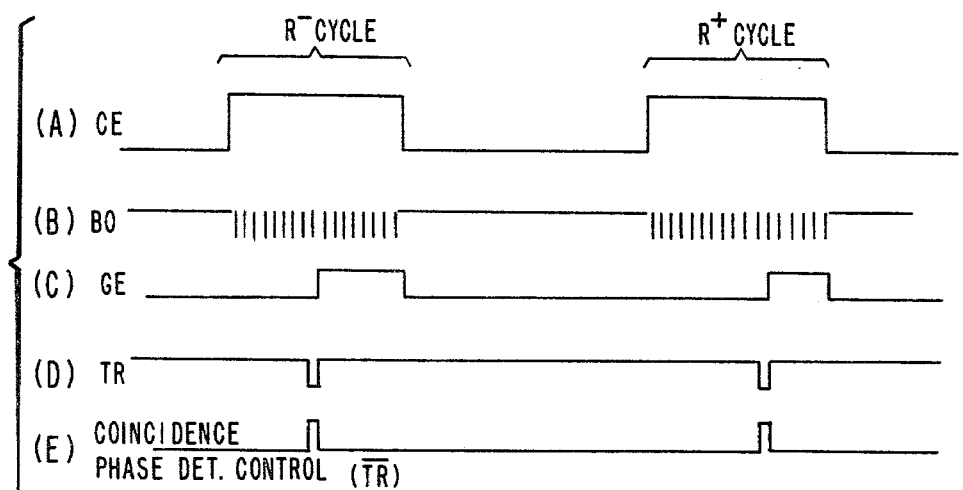
FIGS. 8–11 show some time diagrams.

FIG. 8 shows waveforms present in the circuit of FIG. 7. The operation of the circuit of FIG. 7 is now described in detail as follows.

The first positive transition of the BO (buffer output) signal is transmitted to the set (s) input of flip-flop 94. Its output Q goes low and enables FIG. 8b flip-flop 90 of the reference divider to divide the reference subcarrier $F_{OR}$ by two. Positive transitions of the output Q of flip-flop 90 clock the divide-by-32 circuit 88. After thirty-one clock pulses, the output of the divide-by-32 circuit 88 goes low, while it goes high again with the next positive transition of waveform I (FIG. 9c). The positive transition of TR (FIG. 8d) loads the divide-by-32 circuit 88 and also triggers flip-flop 94. Signal A goes high and disables the divide-by-two circuit 90. At the same time the divider-decoder 86 continues to count the signal BO. After 4 pulses of signal BO, the output of the divider-decoder 86, which is the signal to be measured (G), shown in FIG. 8c goes high and disables itself (stop).

Figure 9:
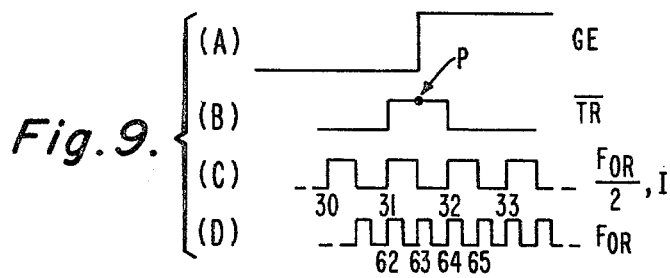

The time reference pulse $\overline{TR}$ (FIG. 8e) closes the coincidence phase detector 64 and connects signal GE to the input of the integrator 66. If signals GE and TR are in coincidence, the output voltage $U_g$ of the integrator 66 does not change because its input current comprises a positive and negative part of equal amplitude, and therefore the R-Y chroma gain is correct. Otherwise $U_g$ changes until coincidence is obtained. The divider ratio of the divider by 32 is calculated as follows:

pulses of signal $BO = \dfrac{1}{280 \text{ kHz}} = 14.2857 \text{ } \mu s$ 1 subcarrier cycle $= \dfrac{1}{4.40625} = 226.95$ ns $\dfrac{14.2857}{226.95} = 62.94 = 63$ pulses In FIG. 9 it can be seen that the center point P of the time reference pulse (FIG. 9b) corresponds to the sixty-third pulse of $F_{OR}$ (FIG. 9b), if the reference divider 90 and 92 is programmed to 32. It should be noted that flip-flop 90 is used to divide $F_{OR}$ by two in order to achieve a wider time reference pulse, as is needed to be generated to keep $R+ + R-/2 = 280$ kHz constant as explained below.

Figure 10:
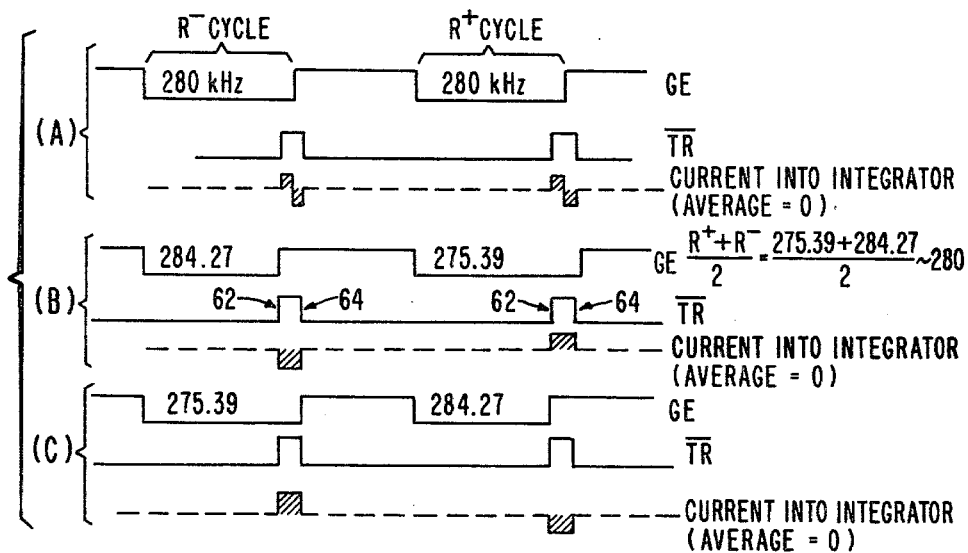

FIG. 8a shows that two cycles (R− cycle and R+ cycle) are used to generate $U_g$. The assumption that $U_g$ does not change if signals TR and GE are in coincidence must be modified as follows: $U_g$ does not change if the average current into the integrator 66 of both cycles is zero. FIG. 10 shows three cases having all an average current of zero for the two cycles. FIG. 10a shows the relations if R− and R+ are exactly 280 kHz (no nonlinearity of the VCO), while FIGS. 10b and 10c shows the relation for a nonlinearity of the VCO of approximately 1.5%. The appropriate extreme values of R+ and R− are calculated as follows. The positive-going edge of signal GE for the R+ signal in FIG. 10b is in coincidence with the 64th clock pulse and therefore the frequency of $$R+ \text{ is: } \dfrac{4 \cdot 4406.25}{64} = 275.39 \sim -4.6 \text{ kHz}$$
$$\text{and } R- \text{ is: } \dfrac{4 \cdot 4406.25}{62} = 284.27 \sim +4.3 \text{ kHz} \Bigg\} \sim \pm 1.5\%$$

Figure 11:
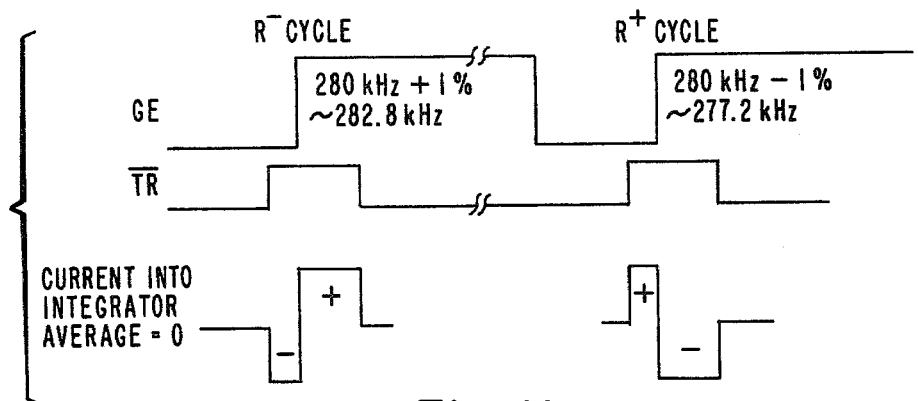

It has been mentioned earlier that the nonlinearity of the VCO is <1% and as a result, the positive-going edge of the signal GE always lies within the positive part of the $\overline{TR}$ pulse for both cycles R+ and R− if the average current into the integrator 66 is zero, and therefore stable operation is obtained. FIG. 11 shows a practical example for a nonlinearity of 1%. It can be seen in FIG. 11 that then R− is 282.8 kHz and R+ is 277.2 kHz and therefore $$\dfrac{R- + R+}{2} = \dfrac{282.8 + 277.2}{2} = 280 \text{ kHz}$$

As mentioned earlier the same could be done to control the B-Y gain. It has been found that very good results are obtained if the B-Y gain is adjustable by means of a potentiometer in the matrix circuit of FIG. 1 comprising stable resistors and feedback-stabilized amplifier. The R-Y gain loop, as described above, then compensates for the temperature and ageing influences for both the R-Y and B-Y line.

Figure 12:
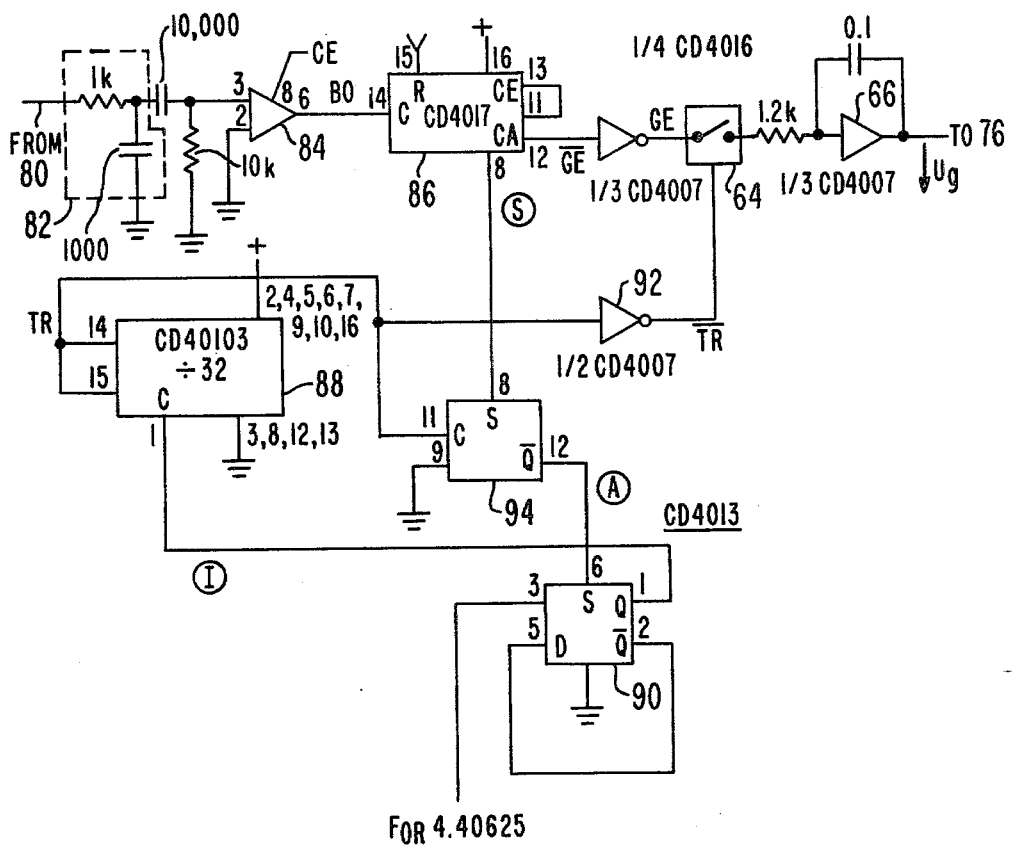
FIG. 12 shows a detailed schematic.

FIG. 12 shows the details of the circuit as used in the RCA Model TK-47 camera including RCA standard integrated circuit type numbers. Its operation is as described.

What is claimed is:

1. A method of controlling the gain of SECAM chroma channel having a frequency modulator, said method comprising inserting a test signal into said channel, measuring the resulting frequency deviation due to said test signal, and automatically controlling the gain of said channel in accordance with the resulting deviation.

2. A method as claimed in claim 1, wherein said test signal is inserted during the vertical blanking interval.

3. A method as claimed in claim 1, wherein said measuring step comprises frequency dividing the deviated signal to provide a signal to be measured, providing time reference pulses, coincidence detecting said signal to be measured and said time reference pulses, and integrating resultant signal of said detecting step.

4. A method as claimed in claim 1, wherein said controlling step comprises applying a control signal to a multiplier.

5. A method as claimed in claim 1 wherein said controlling step comprises shunting said channel.

6. A device comprising a SECAM chroma channel having a frequency modulator, means for inserting a test signal into said channel, means for measuring the resulting frequency deviation due to said test signal, and means for automatically controlling the gain of said channel in accordance with the resulting deviation.

7. A device as claimed in claim 6, wherein said inserting means inserts said test signal during the vertical blanking time.

8. A device as claimed in claim 6, wherein measuring means comprises a divider-decoder for dividing the deviated signal to produce a signal to be measured, a reference divider for dividing a reference signal to produce time reference pulses, a coincidence detector coupled to receive said time reference pulses and said signal to be measured, and an integrator coupled to the coincidence detector.

9. A device as claimed in claim 6, wherein said gain control means comprises a linear multiplier disposed in said channel.

10. A device as claimed in claim 6, wherein said gain control means comprises a shunting element.

* * * * *